United States Patent
Han et al.

(10) Patent No.: US 8,005,914 B2
(45) Date of Patent: Aug. 23, 2011

(54) METHOD AND APPARATUS FOR PROCESSING ALARM/EVENT INFORMATION

(75) Inventors: Lu Han, Shenzhen (CN); Xiaofeng Ji, Shenzhen (CN); Yuzhi Ma, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 12/618,046

(22) Filed: Nov. 13, 2009

(65) Prior Publication Data

US 2010/0057892 A1 Mar. 4, 2010

Related U.S. Application Data

(63) Continuation of application No. PCT/CN2008/071746, filed on Jul. 25, 2008.

(30) Foreign Application Priority Data

Jul. 25, 2007 (CN) .................. 2007 1 0119495

(51) Int. Cl.
G06F 15/16 (2006.01)
G06F 15/173 (2006.01)

(52) U.S. Cl. ........................ 709/207; 709/224

(58) Field of Classification Search .................. 709/207, 709/224
See application file for complete search history.

(56) References Cited

U.S. PATENT DOCUMENTS

| | | | |
|---|---|---|---|
| 6,973,166 B1 | 12/2005 | Tsumpes | |
| 7,054,924 B1 | 5/2006 | Harvey et al. | |
| 7,559,020 B2* | 7/2009 | Jazdzewski et al. | 715/234 |
| 7,685,265 B1* | 3/2010 | Nguyen et al. | 709/223 |
| 7,801,513 B2* | 9/2010 | Jung et al. | 455/414.2 |
| 7,827,199 B2* | 11/2010 | Yip et al. | 707/791 |
| 2004/0210420 A1 | 10/2004 | Lee | |

FOREIGN PATENT DOCUMENTS

| | | |
|---|---|---|
| CN | 1521992 A | 8/2004 |
| CN | 1859211 A | 11/2006 |
| KR | 20020038268 A | 5/2002 |

OTHER PUBLICATIONS

R. Enns, Ed, "NETCONF Configuration Protocol" The IEFT Trust Dec. (2006).

Extended European Search Report dated (mailed) May 18, 2010, issued in related Application No. 08783739.9-2416 I 2154828 PCT/CN2008071746, Hauwei Technologies Co., Ltd.

First Chinese Office Action of Chinese Application No. 200710119495.X Mailing Date: Dec. 24, 2010 Partial.

(Continued)

*Primary Examiner* — Hussein A Elchanti
(74) *Attorney, Agent, or Firm* — Finnegan, Henderson, Farabow, Garrett & Dunner LLP

(57) ABSTRACT

A method and apparatus for processing alarm/event information are disclosed. The method includes: parsing received notification information that includes uniformly sorted alarm/event information; and obtaining the uniformly sorted alarm/event information. The apparatus includes: a parsing module, configured to parse received notification information that includes uniformly sorted alarm/event information; and a processing module, configured to obtain the uniformly sorted alarm/event information. The method and apparatus implement data interworking, reduce XML tags, and improve the efficiency of transmitting data on the network.

7 Claims, 3 Drawing Sheets

OTHER PUBLICATIONS

Shin, Donwook, "XNMP—an XML based Network Management Protocol over VoIP" Proceedings of the Sixth International Conference on Software Engineering, Artificial Intelligence, Networking and Parallel/Distributed Computing and First ACIS International Workshop on Self-Assembling Wireless Networks XP10601602A © 2005 IEEE.

Written Opinion of the International Searching Authority (translation) dated (mailed) Nov. 6, 2008, issued in related Application No. PCT/CN2008/071746, filed Jul. 25, 2008, Huawei Technologies Co., Ltd.

Chisholm et al, "NETCONF Event Notifications Network Working Group," Jul. 8, 2007 (C) The IETF Trust (2007).

* cited by examiner

METHOD AND APPARATUS FOR PROCESSING ALARM/EVENT INFORMATION

CROSS-REFERENCE TO RELATED APPLICATIONS

This application is a continuation of International Application No. PCT/CN2008/071746, filed on Jul. 25, 2008, which claims priority to Chinese Patent Application No. 200710119495.X, filed on Jul. 25, 2007, both of which are hereby incorporated by reference in their entireties.

FIELD OF THE INVENTION

The present invention relates to data communications, and in particular, to a method and apparatus for processing alarm/event information.

BACKGROUND OF THE INVENTION

Network Configuration (NETCONF) is a protocol for network device configuration management. It is formulated by the NETCONF working group founded by the Internet Engineering Task Force (IETF) in the operations and management area, and is based on the eXtensible Markup Language (XML). The NETCONF protocol provides a mechanism for installing, maintaining, and deleting network devices. The NETCONF protocol uses XML data to encapsulate configuration data, and its protocol operations take place at the simple Remote Procedure Call (RPC) layer.

FIG. 1 shows the structure of the NETCONF protocol in the prior art. The NETCONF protocol is divided into four layers:

1. The transport protocol layer provides a communication path between the client and the server. NETCONF can be layered over any transport protocol such as the Blocks Extensible Exchange Protocol (BEEP), Secure Shell (SSH), Secure Socket Layer (SSL), and Console.
2. The RPC layer provides a simple, transport-independent framing mechanism for encoding RPCs.
3. The operations layer defines a set of base operations invoked as RPC methods with XML-encoded parameters.
4. The content layer has not been defined.

FIG. 2 is a flowchart of sending notification information through the NETCONF protocol in the prior art.

In the XML Path Language (XPath), if the path begins with a slash (/), the path is an absolute path to an element. For example:

For the following XML file:

```
<AAA>
    <BBB/>
    <CCC/>
    <BBB/>
    <BBB/>
    <DDD>
        <BBB/>
    </DDD>
    <CCC/>
</AAA>
```

"Xpath:/AAA/DDD/BBB" indicates that all sub-elements of the sub-element "DDD" of "AAA" are selected.

The prior NETCONF protocol provides a mechanism of an asynchronous notification information service, including the capability operations required for the device to support the service.

The prior format of the notification sent through NETCONF is exemplified below:

```
<?xml version="1.0" encoding="UTF-8"?>
<notification xmlns="urn:ietf:params:xml:ns:netconf:notification:1.0">
    <data xmlns="http://example.com/event/1.0">
        <severity>notice</severity>
        <eventClasses><configuration/><audit/></eventClasses>
        <sequenceNumber>2</sequenceNumber>
        <dateAndTime>2000-01-12T12:13:14Z</dateAndTime>
        <user>Fred Flinstone</user>
        <operation>
            <edit-config>
                <target>
                    <running/>
                </target>
                <edit-config>
                    <top xmlns="http://example.com/schema/1.2/config">
                        <interfaces>
                            <interface>
                                <name>Ethernet0/0</name>
                                <mtu>1500</mtu>
                            </interface>
                        </interfaces>
                    </top>
                </edit-config>
            </operation>
        </event>
    </data>
</notification>
```

FIG. 3 shows a data structure of a notification in the prior art. The prior NETCONF protocol does not define the content in the notification, and includes only one "data" element which may be of any type. In this "data" element, any type of data can be written, and the amount of data is not limited. The XML Schema is as follows:

```
<!-- <Event> operation -->
<xs:complexType name="NotificationType">
    <xs:sequence>
        <xs:element name="data" type="netconf:dataInlineType"/>
    </xs:sequence>
</xs:complexType>
<xs:element name="notification" type="NotificationType"/>
```

In the process of implementing the present invention, the inventor discovers that the data model of the notification is not abstract and that the public data is not summarized, which affects interworking. For example, Network Management System (NMS) A needs to obtain the element "EventName" from the notification, and use it as a condition for querying the alarm/event on the NMS; device B does not report "EventName" in the notification, but identifies the alarm/event in other modes. When the data reported by B is processed on A, problems may occur for lack of the keyword field.

The prior notification uses the operation (such as "edit-contig") that triggers the alarm/event and its element (such as "interface") to describe the alarm/event object, for example:

```
<operation>
    <edit-config>
        <target>
            <running>
        </target>
        <edit-config>
            <top xmlns="http://example.com/schema/1.2/config">
                <interfaces>
                    <interface>
                        <name>Ethernet0/0</name>
                        <mtu>1500</mtu>
```

```
        </interface>
      </interfaces>
    </top>
  </edit-config>
</operation>
```

Therefore, too many XML tags are introduced to identify the interface Ethernet0/0, and a single notification packet is too big, which affects the data transmission efficiency.

SUMMARY OF THE INVENTION

Embodiments of the present invention provide a method and apparatus for processing alarm/event information to implement data interworking, to reduce XML tags, and to improve the efficiency of transmitting data on the network.

A method for processing alarm/event information includes: parsing received notification information that includes uniformly sorted alarm/event information; and obtaining the uniformly sorted alarm/event information.

An apparatus for processing alarm/event information includes: a parsing module, configured to parse received notification information that includes uniformly sorted alarm/event information; and a processing module, configured to obtain the uniformly sorted alarm/event information.

In the embodiments of the present invention, the method and apparatus for processing alarm/event information implement data interworking, reduce XML tags, and improve the efficiency of transmitting data on the network.

DETAILED DESCRIPTION OF THE INVENTION

The technical solution under the present invention is hereinafter described in detail with reference to accompanying drawings and exemplary embodiments.

Figure 1:
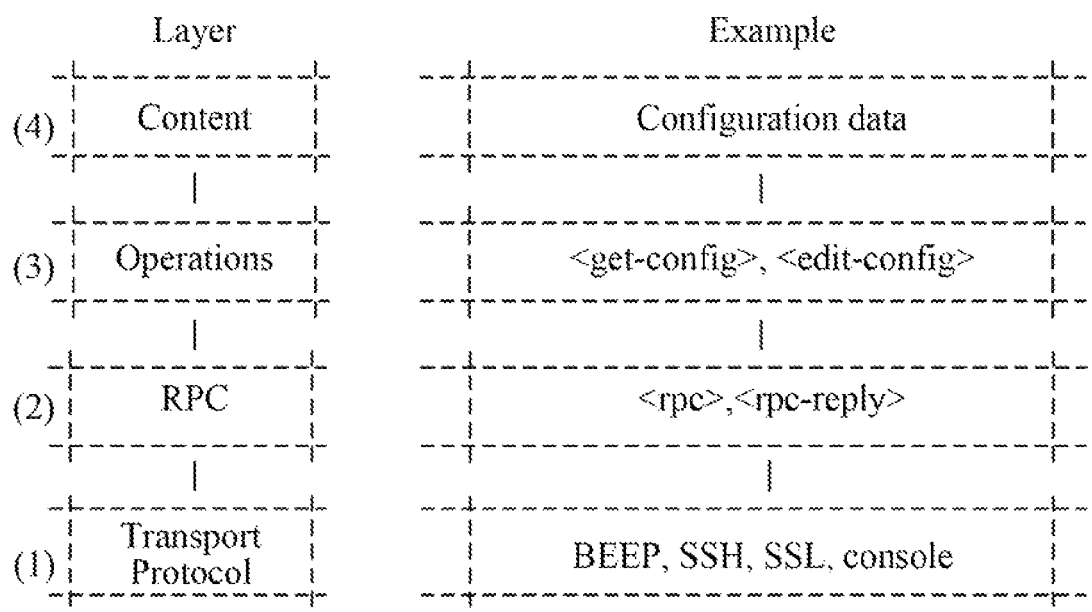
FIG. 1 shows a structure of a NETCONF protocol in the prior art.
Figure 2:
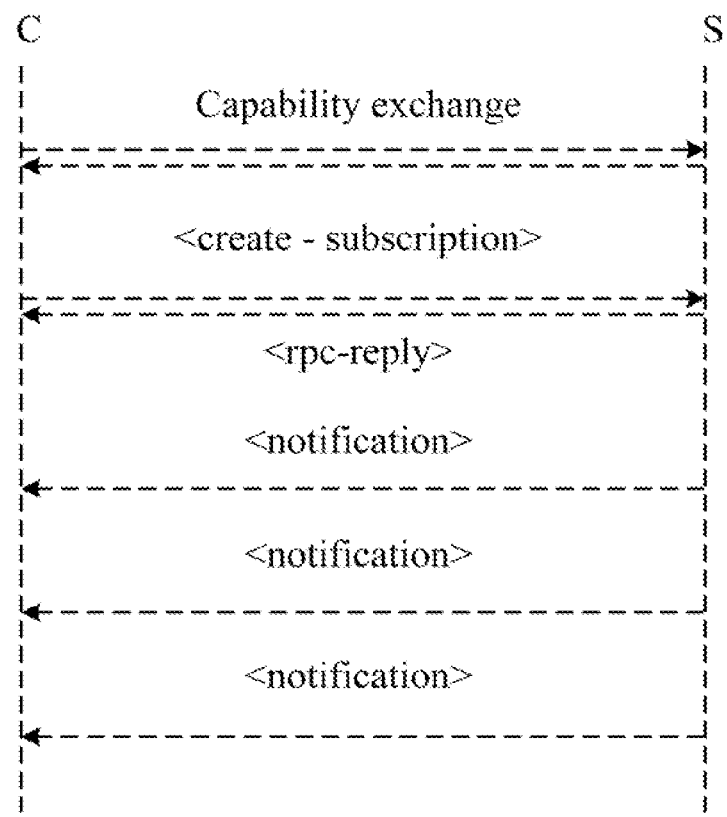
FIG. 2 is a flowchart of sending notification information through a NETCONF protocol in the prior art.
Figure 3:
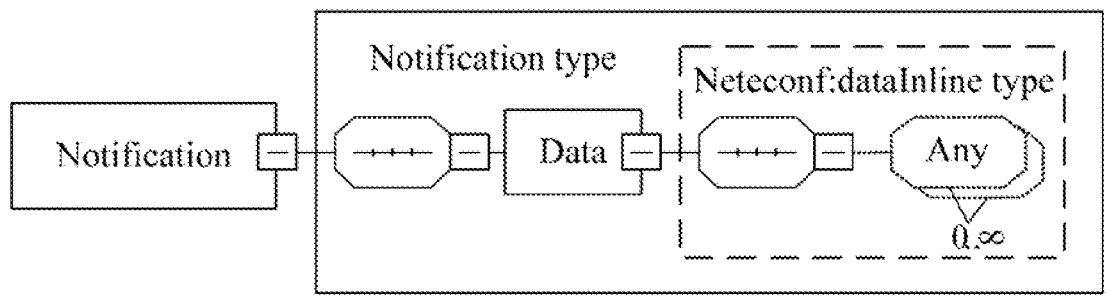
FIG. 3 shows a notification data structure in the prior art.
Figure 4:
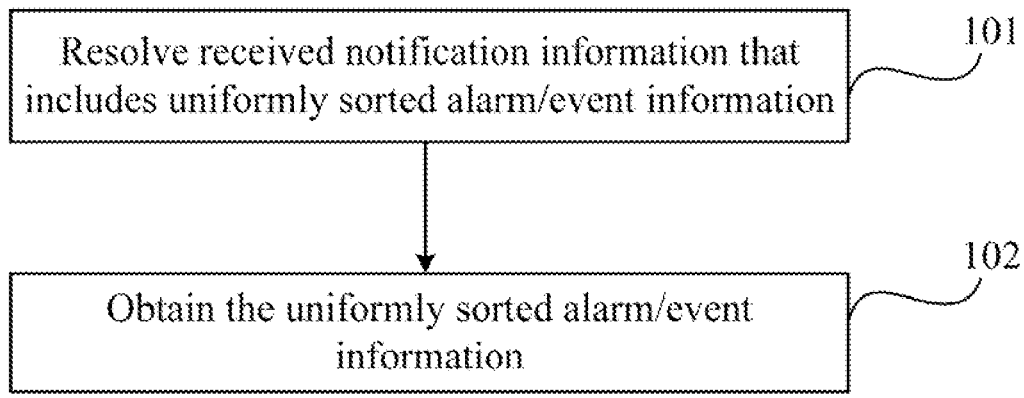
FIG. 4 is a flowchart of a method for processing alarm/event information in an embodiment of the present invention.

FIG. 4 is a flowchart of a method for processing alarm/event information in an embodiment of the present invention. The method includes the following steps:

Step 101: Received notification information including uniformly sorted alarm/event information is parsed.

Step 102: The uniformly sorted alarm/event information is obtained.

Table 1 shows the detailed alarm/event information included in the notification information in the method for processing alarm/event information in an embodiment of the present invention:

TABLE 1

| Tag | Type | Mandatory/Optional | Description |
| --- | --- | --- | --- |
| TimeStamps | dateTime | Mandatory | Alarm/Event occurrence time information |
| SequenceNumber | Integer | Mandatory | Alarm/Event sequence information |
| EventName | string | Mandatory | Alarm/Event name information |
| EventSeverity | Simple type | Mandatory | Alarm/Event severity information |
| EventType | string | Mandatory | Alarm/Event type information |
| EventLocation | Complex type | Mandatory | Alarm/Event location information |
| EventCause | string | Mandatory | Alarm/Event cause information |
| SpecificProblems | string | Optional | Alarm/Event description information |
| AdditionalText | string | Optional | Additional information about the alarm/event |

Table 1 shows that the alarm/event information includes alarm/event location information, Alarm/Event occurrence time information, alarm/event sequence information, alarm/event name information, alarm/event severity information, alarm/event type information, and alarm/event cause information, which are all mandatory. The alarm/event location information may be carried by an XML tag "EventLocation"; the Alarm/Event occurrence time information is carried by an XML tag "TimeStamps"; the alarm/event sequence information is carried by an XML tag "SequenceNumber"; the alarm/event name information is carried by an XML tag "EventName"; the alarm/event severity information is carried by an XML tag "EventSeverity"; the alarm/event type information is carried by an XML tag "EventType"; and the alarm/event cause information is carried by an XML tag "EventCause"; The alarm/event description information and the additional information about the alarm/event are optional; the alarm/event description information is carried by an XML tag "SpecificProblems", and the additional information about the alarm/event is carried by an XML tag "AdditionalText".

Table 1 is only an exemplary embodiment of alarm/event information sorting, but information sorting is not limited to Table 1. In other embodiments, the alarm/event location information, alarm/event occurrence time information, alarm/event sequence information, alarm/event name information, alarm/event severity information, alarm/event type information, or alarm/event cause information, or any combination thereof, may be set to "optional"; and the alarm/event description information, and the additional information about the alarm/event may be set to "mandatory". Moreover, omission of one or more of the mandatory or optional information items is also allowed.

Because the alarm/event information is sorted uniformly in this embodiment, the processing efficiency is higher in contrast to the unsorted information in the prior art. The sorting method above is only an exemplary sorting method, but other sorting modes are also allowed. Specially, all information is of the same type.

The alarm/event severity in the alarm/event severity information falls into these types: critical, major, minor, warning, and event. The alarm/event type information may include but is not limited to: Communications, Environmental, Equipment alarm, Processing Error Software/Process, and Quality of service (QoS) alarm. The alarm/event location information may include multiple information items; and the alarm/event description information may include recovery recommendations. A "path_indicator" attribute may be set for the alarm/event location information, and this alarm/event location information may be expressed as "XPath".

Therefore, such alarm/event information facilitates data interworking and extraction. Meanwhile, because the data tag of any type is reserved, the original flexibility is reserved.

Figure 5:
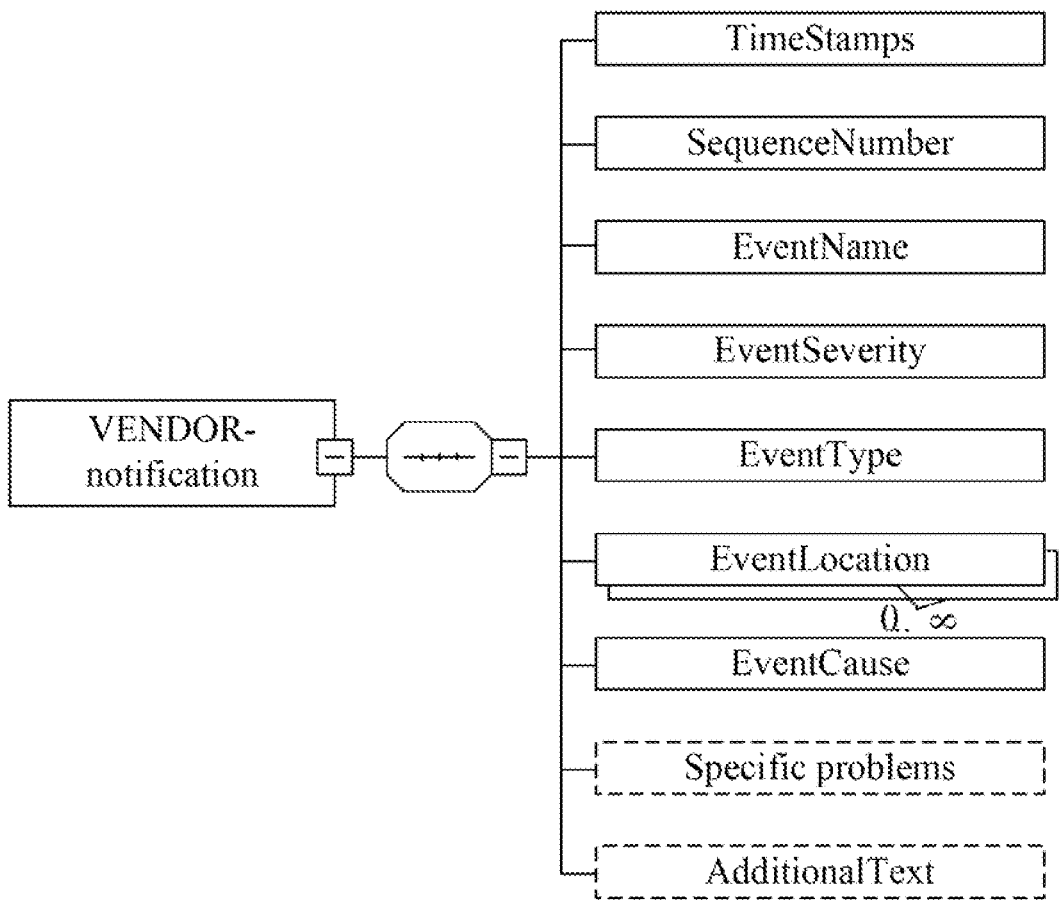
FIG. 5 shows a data structure of a method for processing alarm/event information in an embodiment of the present invention.

FIG. 5 shows a data structure of a method for processing alarm/event information in an embodiment of the present invention. The alarm/event information tags in the notification information include: TimeStamps, SequenceNumber, EventName. EventSeverity, EventType, EventLocation, EventCause, Specific Problems, and AdditionalText.

The Schema is exemplified below:

```
<?xml version="1.0" encoding="UTF-8"?>
<!-- edited with XMLSPY v2004 rel. 2 U (http://www.xmlspy.com)
by user1 (Vendor) -->
<xs:schema targetNamespace="http:/Vendor.com/common/
  VendorNotification"
xmlns:xs="http://www.w3.org/2001/XMLSchema"
xmlns="http://Vendor.com/common/VendorNotification"
elementFormDefault="qualified" attributeFormDefault="unqualified">
  <xs:import namespace="urn:ietf:params:xml:ns:netconf:notification:1.0"
schemaLocation="../project/XML/netconf/xsd/NC-Notification.xsd"/>
  <!-- Type Definition -->
  <xs:simpleType name="EventSeverityType">
    <xs:restriction base="xs:string">
      <xs:enumeration value="Critical"/>
      <xs:enumeration value="Major"/>
      <xs:enumeration value="Minor"/>
      <xs:enumeration value="Warning"/>
    </xs:restriction>
  </xs:simpleType>
  <!-- Event Type Definitions -->
  <xs:simpleType name="EventTypeDef">
    <xs:restriction base="xs:string">
      <xs:enumeration value="Communications alarm"/>
      <xs:enumeration value="Environmental alarm"/>
      <xs:enumeration value="Equipment alarm"/>
      <xs:enumeration value="Processing Error alarm"/>
      <xs:enumeration value="Software/Process alarm"/>
      <xs:enumeration value="QoS alarm"/>
    </xs:restriction>
  </xs:simpleType>
  <xs:element name="VENDOR-notification">
    <xs:annotation>
      <xs:documentation>Extend notification with common elements</xs:documentation>
    </xs:annotation>
    <xs:complexType>
      <xs:sequence>
        <xs:element name="TimeStamps">
          <xs:complexType>
            <xs:simpleContent>
              <xs:extension base="xs:dateTime"/>
            </xs:simpleContent>
          </xs:complexType>
        </xs:element>
        <xs:element name="SequenceNumber" type="xs:unsignedLong"/>
```
```
        <xs:element name="EventName" type="xs:string"/>
        <xs:element name="EventSeverity" type="EventSeverityType"/>
        <xs:element name="EventType" type="EventTypeDef"/>
        <xs:element name="EventLocation" maxOccurs="unbounded">
          <xs:complexType>
            <xs:attribute name="path_indicator" type="xs:string" use="required"/>
          </xs:complexType>
        </xs:element>
        <xs:element name="EventCause" type="xs:string"/>
        <xs:element name="SpecificProblems" type="xs:string" minOccurs="0"/>
        <xs:element name="AdditionalText" type="xs:string" minOccurs="0"/>
      </xs:sequence>
    </xs:complexType>
  </xs:element>
</xs:schema>
```

In this embodiment, "EventName" identifies the failure cause; and "EventLocation" identifies the alarm/event location information.

The XML file of a notification of "linkdown" of an actual interface is as follows:

```
<?xml version="1.0" encoding="UTF-8"?>
<ncnt:notification xmlns="http://Vendor.com/common/
  VendorNotification"
  xmlns:ncnt="urn:ietf:params:xml:ns:netconf:notification:1.0"
  xmlns:xsi="http://www.w3.org/2001/XMLSchema-instance"
  xsi:schemaLocation="http://Vendor.com/common/VendorNotification
    ..\project\XML\netconf\xsd\VENDOR-notification.xsd">
  <ncnt:data>
    <VENDOR-notification>
      <TimeStamps>2007-01-12T03:40:00</TimeStamps>
      <SequenceNumber>123</SequenceNumber>
      <EventName>LinkDown</EventName>
      <EventSeverity>Major</EventSeverity>
      <EventType>Communications alarm</EventType>
      <EventLocation path_indicator="//ifTable/interface/ifDescr=
        'Eth0/1'"/>
      <EventCause>port down</EventCause>
      <SpecificProblems>we need more exam</SpecificProblems>
      <AdditionalText>this is used to add more comments</
        AdditionalText>
    </VENDOR-notification>
  </ncnt:data>
</ncnt:notification>
```

"EventName" describes an alarm/event named "Linkdown", and the location where the alarm/event occurs is identified by a "path_indicator" attribute of "EventLocation" to be the Ethernet interface Eth0/1/1. Therefore, the XPath identifies the alarm/event location, thus reducing the XML tags, shortening the data packet, and improving the efficiency of transmitting data.

For example, in the prior art, the alarm/event location information is described through the following XML file:

```
<ifTable>
  <interface ifIndex="1">
    <ifDescr>Eth0/1</ifDescr>
    <ifSpeed>100</ifSpeed>
    <ifType>Ethernet</ifType>
    <ifAdminStatus>true</ifAdminStatus>
  </interface>
</ifTable>
```

In the method for processing alarm/event information in this embodiment, the alarm/event location information is described through the following statement:

<EventLocation path_indicator="//ifTable/interface/ifDescr='Eth0/1'"/>

The following part carried in the prior art is ignored:

```
<ifSpeed>100</ifSpeed>
<ifType>Ethernet</ifType>
<ifAdminStatus>true</ifAdminStatus>
```

The method for processing the alarm/event information in this embodiment occupies 70 bytes, while the method in the prior art occupies 89 bytes. Therefore, the data amount involved in this embodiment is 21% less than the data amount in the prior art.

An apparatus for processing the alarm/event information in an embodiment of the present invention includes: a parsing module, configured to parse received notification information that includes uniformly sorted alarm/event information; and a processing module, configured to obtain the uniformly sorted alarm/event information.

Moreover, after the corresponding XPath is obtained through the "path_indicator" attribute of the EventLocation tag, the XPath may be used directly to query other alarm/event information. At the time of query, it is not necessary to reconstruct an XPath, thus improving the processing efficiency of the program.

In the embodiments of the present invention, the method and apparatus for processing alarm/event information implement data interworking, reduce XML tags, and improve the efficiency of transmitting data on the network. Moreover, the method under the present invention is not only applicable to the NETCONF protocol for network configuration, but also applicable to other sectors for state monitoring.

It is understandable to those skilled in the art that all or part of the steps of the foregoing method embodiments may be implemented by hardware instructed by a program. The program may be stored in a computer-readable storage medium. When being executed, the program performs steps of the foregoing method embodiments. The storage medium may be any medium suitable for storing program codes, for example, a Read Only Memory (ROM), a Random Access Memory (RAM), a magnetic disk, or a compact disk.

Although the invention is described through several exemplary embodiments, the invention is not limited to such embodiments. It is apparent that those skilled in the art can make modifications and variations to the invention without departing from the scope of the invention. The invention is intended to cover such modifications and variations provided that they fall in the scope of protection defined by the following claims or their equivalents.

What is claimed is:

1. A hardware-implemented method for processing alarm/event information, comprising:
   parsing, by a parsing device, received notification information, the notification information comprising uniformly sorted alarm/event information; and
   obtaining, by a processing device, the uniformly sorted alarm/event information
   wherein:
      the alarm/event information comprises alarm/event location information,
      the alarm/event location information is carried by an eXtensible Markup Language (XML) tag "EventLocation", and
      a "path_indicator" attribute is set for the alarm/event location information, and the alarm/event location information is expressed as XML Path Language.

2. The method of claim 1, wherein the alarm/event information comprises at least one of:
   alarm/event occurrence time information, alarm/event sequence information, alarm/event name information, alarm/event severity information, alarm/event type information, alarm/event cause information, alarm/event description information, and additional information about an alarm/event.

3. The method of claim 2, wherein alarm/event occurrence time information is carried by an XML tag "TimeStamps"; the alarm/event sequence information is carried by an XML tag "SequenceNumber"; the alarm/event name information is carried by an XML tag "EventName"; the alarm/event severity information is carried by an XML tag "EventSeverity"; the alarm/event type information is carried by an XML tag "EventType"; and the alarm/event cause information is carried by an XML tag "EventCause"; the alarm/event description information is carried by an XML tag "SpecificProblems", and the additional information about the alarm/event is carried by an XML tag "AdditionalText".

4. The method of claim 1, wherein the method for processing the alarm/event information is applicable to network configuration and state monitoring.

5. An apparatus for processing alarm/event information, comprising:
   a parsing device, configured to parse received notification information, the information comprising uniformly sorted alarm/event information; and
   a processing device, configured to obtain the uniformly sorted alarm/event information,
   wherein:
      the alarm/event information comprises alarm/event location information,
      the alarm/event location information is carried by an eXtensible Markup Language (XML) tag "EventLocation", and
      a "path_indicator" attribute is set for the alarm/event location information, and the alarm/event location information is expressed as XML Path Language.

6. The apparatus of claim 5, wherein the alarm/event information comprises at least one of:
   alarm/event occurrence time information, alarm/event sequence information, alarm/event name information, alarm/event severity information, alarm/event type information, alarm/event cause information, alarm/event description information, and additional information about an alarm/event.

7. The apparatus of claim 6, wherein alarm/event occurrence time information is carried by an XML tag "TimeStamps"; the alarm/event sequence information is carried by an XML tag "SequenceNumber"; the alarm/event name information is carried by an XML tag "EventName"; the alarm/event severity information is carried by an XML tag "EventSeverity"; the alarm/event type information is carried by an XML tag "EventType"; and the alarm/event cause information is carried by an XML tag "EventCause"; the alarm/event description information is carried by an XML tag "SpecificProblems", and the additional information about the alarm/event is carried by an XML tag "AdditionalText".

* * * * *